(12) United States Patent
Park et al.

(10) Patent No.: US 7,561,341 B2
(45) Date of Patent: Jul. 14, 2009

(54) LENS, METHOD OF MANUFACTURING THE LENS, AND CAMERA HAVING THE LENS

(75) Inventors: So Yeon Park, Seoul (KR); Jae Wook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 11/779,106

(22) Filed: Jul. 17, 2007

(65) Prior Publication Data
US 2008/0019016 A1 Jan. 24, 2008

(30) Foreign Application Priority Data
Jul. 18, 2006 (KR) .................... 10-2006-0066721

(51) Int. Cl.
*G02B 1/06* (2006.01)
*G02B 3/14* (2006.01)

(52) U.S. Cl. ...................................... 359/667; 359/666
(58) Field of Classification Search .......... 359/665–667
See application file for complete search history.

(56) References Cited

U.S. PATENT DOCUMENTS 7,385,673 B2 * 6/2008 Furukawa et al. ............. 355/53

* cited by examiner

*Primary Examiner*—William C Choi
(74) *Attorney, Agent, or Firm*—Birch, Stewart, Kolasch & Birch, LLP

(57) ABSTRACT

A lens having a supercritical fluid is disclosed. The lens includes a package storing a supercritical fluid and a density changing element for changing the density of the fluid.

20 Claims, 5 Drawing Sheets

LENS, METHOD OF MANUFACTURING THE LENS, AND CAMERA HAVING THE LENS

CROSS-REFERENCE TO RELATED APPLICATION

This application claims the benefit of Korean Patent Application No. 10-2006-0066721, filed on Jul. 18, 2006, which is hereby incorporated by reference in its entirety as if fully set forth herein.

BACKGROUND OF THE INVENTION

1. Field of the Invention

The present invention relates to a lens, and more particularly, to a lens having a supercritical fluid.

2. Discussion of the Related Art

Various conventional products, such as cameras, projectors, and laser printers, adopting a lens need a focusing or zooming function of the lens from the characteristic point of view. In the past, a method of moving a lens, to focus or zoom the lens, was normally used. Recently, however, a method of changing the shape of a lens has been proposed with the development of various technologies.

When using this conventional method of moving the lens to focus or zoom the lens, a drive unit for driving the lens is required, and a large space necessary to drive the lens must be secured. The zooming function for moving the lens is performed by the operation of a motor. Consequently, the power consumption is increased, and therefore, a battery is rapidly exhausted. In order to solve the above-mentioned problems, i.e., to minimize the increase of the size and the power consumption, there has been carried out research on a method of changing the shape of a lens itself, instead of moving the lens, to accomplish the zooming function of the lens.

Changing the shape of the lens may be accomplished by using a micro electro mechanical system (MEMS) technology or by using a liquid as the lens. In the MEMS technology, the lens is divided into several lens sections, and the divided lens sections are separately controlled to diffract light and thus adjust the magnifying power. For the MEMS technology, the lens is divided into a limited number of lens sections, with the result that the characteristics of the lens may be partially restricted. For the liquid lens, on the other hand, the lens may be affected by an external force, such as gravity, or the safety of the lens may not be guaranteed.

The conventional method of using the liquid as the lens has been generally carried out based on a volume change type method in which a liquid is stored in a transparent film, and the volume of the transparent film is changed to change the focal distance of the lens, or an electrowetting type method in which a hemispherical liquid lens is formed on an electrode, and voltage is applied to the liquid lens to change the focal distance of the liquid lens. Recently, the electrowetting type method has attracted considerable attention.

FIGS. 1A and 1B are sectional views illustrating a conventional electrowetting type lens. Hereinafter, the conventional electrowetting type lens will be described with reference to FIGS. 1A and 1B.

As shown in FIGS. 1A and 1B, a barrier, which is constituted by an insulation film 12 and an electrode 13, is formed on a substrate 14, which is made of glass. A conductive aqueous liquid 15 and a nonconductive oily liquid 16 are injected into the insulation film 12, and a hydrophobic coating film 11 is formed to cover the conductive aqueous liquid 15 and the nonconductive oily liquid 16 in a sealed state. At this time, the spherical interface between the conductive aqueous liquid 15 and the nonconductive oily liquid 16 serves as a lens. When voltage is not applied to the conductive aqueous liquid 15 and the nonconductive oily liquid 16, the interface between the conductive aqueous liquid 15 and the nonconductive oily liquid 16 takes a shape as shown in FIG. 1A. When voltage is applied to the conductive aqueous liquid 15 and the nonconductive oily liquid 16, the interface between the conductive aqueous liquid 15 and the nonconductive oily liquid 16 becomes flat, and then takes a shape as shown in FIG. 1B.

When voltage is not applied to the conductive aqueous liquid 15 and the nonconductive oily liquid 16, as shown in FIG. 1A, the interface between the conductive aqueous liquid 15 and the nonconductive oily liquid 16 serves as a concave lens. When voltage is applied to the conductive aqueous liquid 15 and the nonconductive oily liquid 16, as shown in FIG. 1B, molecules of the conductive aqueous liquid 15 move toward the electrode 13 while the molecules of the conductive aqueous liquid 15 have a polarity. As a result, the interface between the conductive aqueous liquid 15 and the nonconductive oily liquid 16 changes into a shape as shown in FIG. 1B. Consequently, the interface between the conductive aqueous liquid 15 and the nonconductive oily liquid 16 serves as a convex lens for converging incident beams into one point.

As described above, it is possible to control the interface between the two liquids by adjusting voltage applied to the conductive liquid, thereby adjusting the focal distance of the lens without the mechanical movement of the lens. In the conventional electrowetting type lens, however, it is required that the voltage be applied to the conductive liquid at room temperature and atmospheric pressure, with the result that the efficiency of the lens is still a serious problem.

SUMMARY OF THE INVENTION

Accordingly, the present invention is directed to a lens, a method of manufacturing the lens, and a camera having the lends that substantially obviate one or more problems due to limitations and disadvantages of the related art.

To achieve advantages and in accordance with the purpose of the invention, as embodied and broadly described herein, a lens includes a package storing a supercritical fluid and a density changing element for changing the density of the fluid.

In another aspect of the present invention, a lens includes a package having a lens shape patterned therein, a supercritical fluid stored in the package, and a volume changing element for changing the volume of the fluid.

In another aspect of the present invention, a camera includes a main body, a lens, constructed as described in above paragraph, mounted in the main body, and an iris for controlling the amount of light incident into the main body through the lens.

In a further aspect of the present invention, a method of manufacturing a lens includes preparing a package having a lens shape patterned therein, injecting a supercritical fluid into the lens shape and sealing the package, and forming a volume changing element for changing the volume of the fluid.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
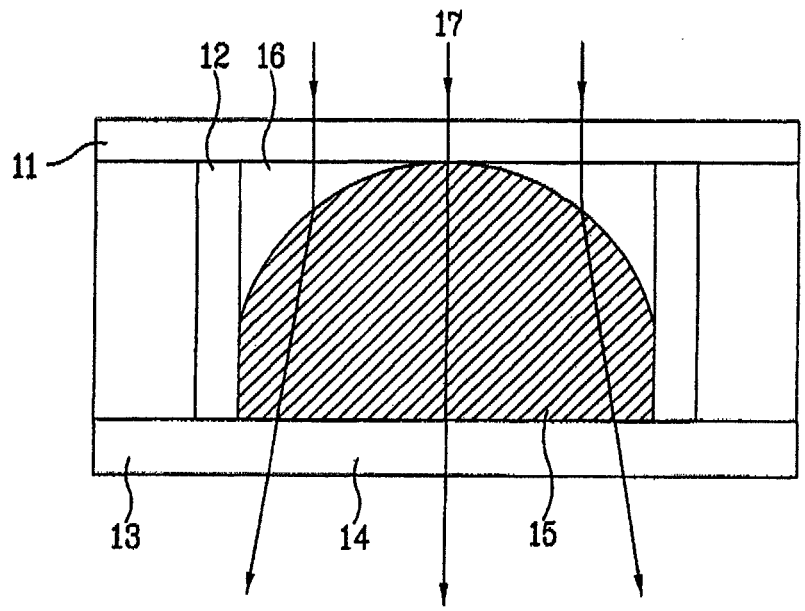
FIGS. 1A and 1B are sectional views illustrating a conventional electrowetting type lens.
Figure 1B:
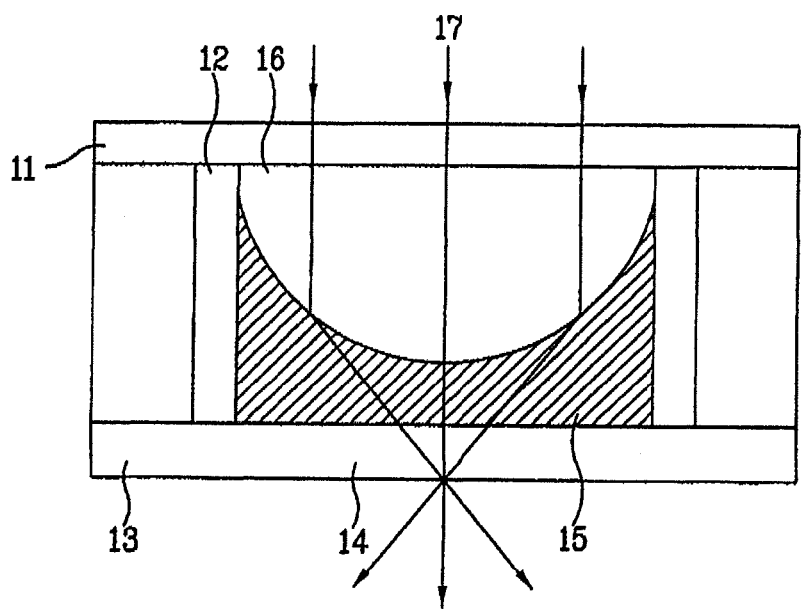
Figure 2A:
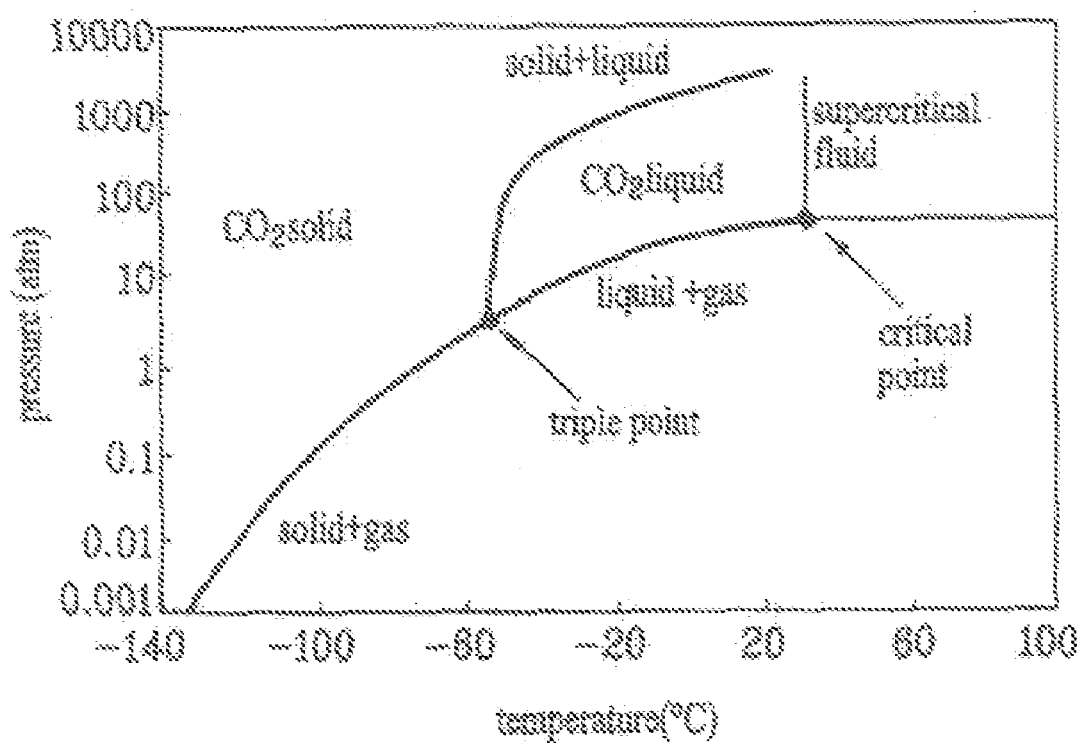
FIGS. 2A and 2B are views illustrating the change in characteristics of carbon dioxide based on temperature.

When the pressure or temperature of a material is increased, as shown in FIG. 2A, the material reaches a critical point via a triple point. In a critical state in which a gas and a liquid is mixed, the density, viscosity, diffusion coefficient, and polarity of the material are greatly changed in succession, when the pressure or temperature near the critical point is changed. The material in the above-described critical state is referred to as a supercritical fluid.

Figure 2B:
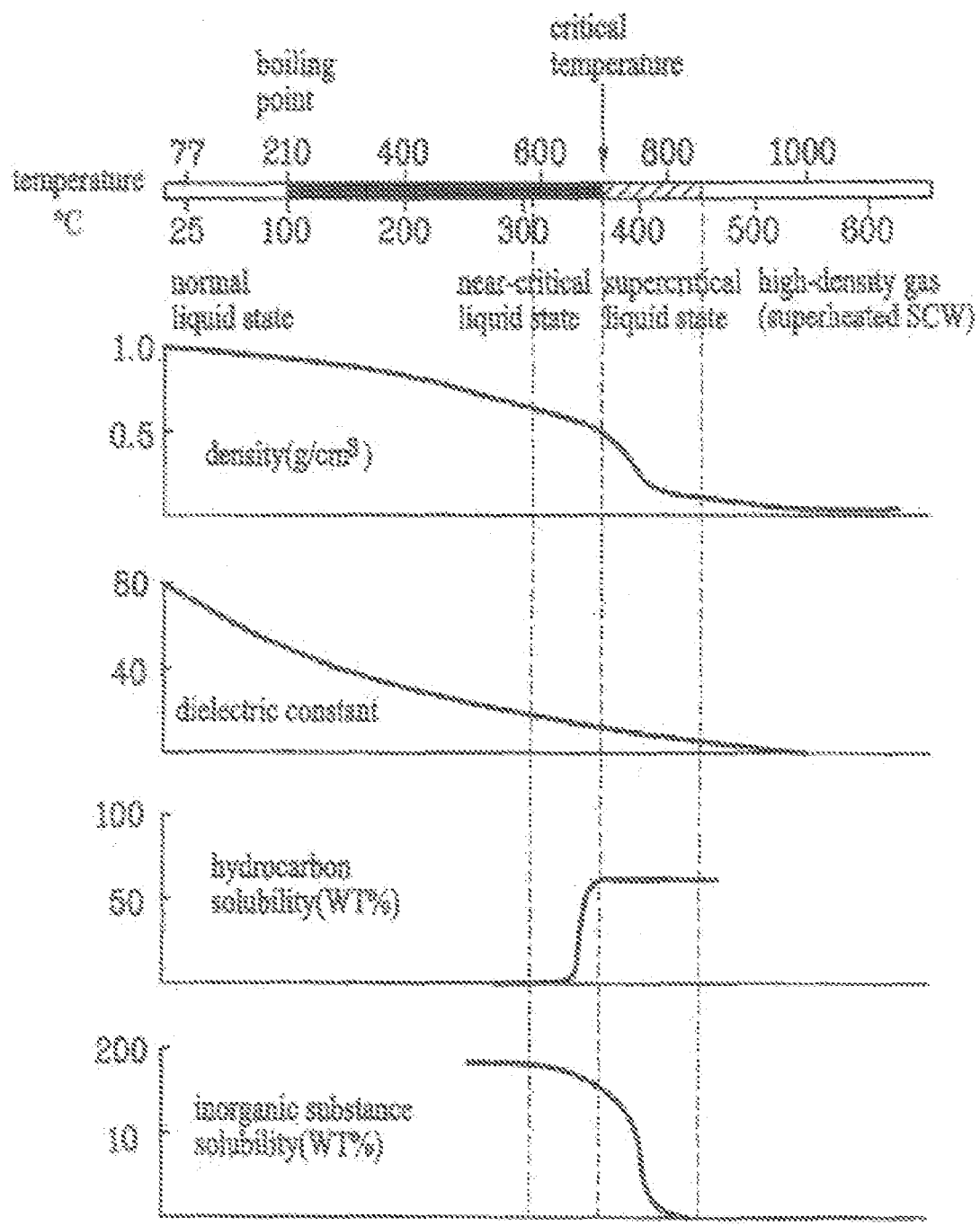

FIG. 2B is a view illustrating the change in density, dielectric constant, hydrocarbon solubility, and inorganic substance solubility of carbon dioxide in a supercritical state based on the change in temperature of the carbon dioxide. As shown in FIG. 2B, the characteristics of the carbon dioxide, especially the density, hydrocarbon solubility, and inorganic substance solubility of the carbon dioxide, abruptly change, even when the temperature of the carbon dioxide is slightly changed, near the critical temperature. As the state of the supercritical fluid greatly changes with slight change in temperature of the supercritical fluid, as described above, the supercritical fluid is used in various applications. The present invention provides a lens that is easily and effectively controllable using the characteristics of the above-described supercritical fluid.

Figure 3A:
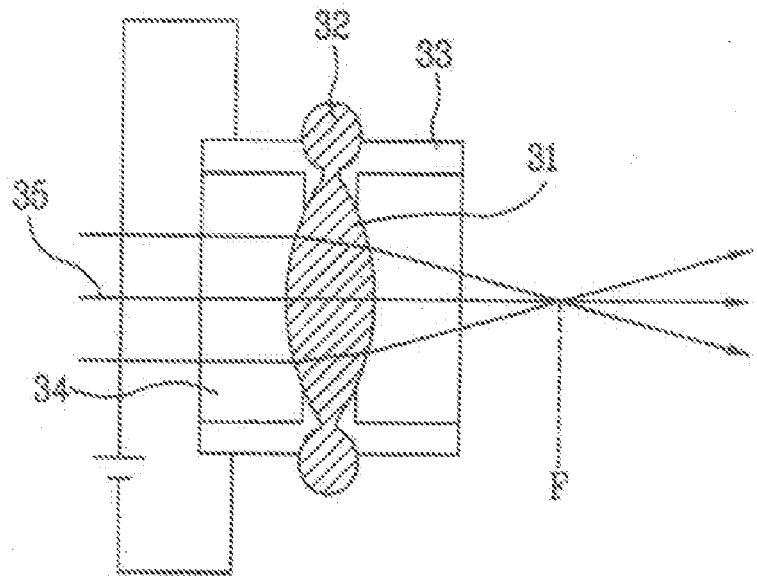
FIGS. 3A and 3B are sectional views illustrating a lens according to an embodiment of the present invention.
Figure 3B:
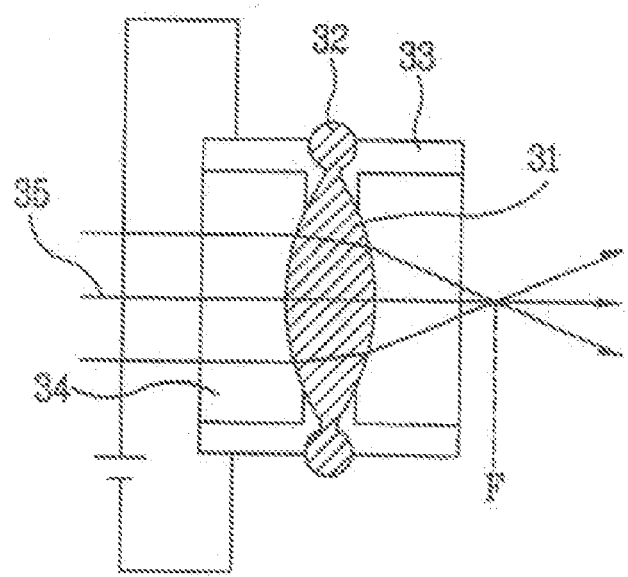

FIGS. 3A and 3B are sectional views illustrating a lens according to an embodiment of the present invention. As shown in FIG. 3A, the lens according to the present invention includes a package 34 having a lens shape patterned therein, a supercritical fluid 31 filled in the package 34, thermionic heat-into-electricity converters (TEC) 33 for applying heat necessary to maintain the supercritical state of the supercritical fluid 31 to the supercritical fluid 31, and a buffer 32 for buffering the volume change of the supercritical fluid 31.

The package 34 is made of a rigid material that transmits light, withstands pressure, and does not change in shape thereof with the change in temperature thereof. Specifically, the package 34 is made of glass. Also, as shown in FIG. 3A, the interior of the package 34 is patterned in the shape of a convex lens to serve as a lens. The supercritical fluid 31 is stored in the package 34. In a process for packaging the supercritical fluid 31 in the package 34, a pressure near the critical point is created.

Also, the thermionic heat-into-electricity converters 33 are attached to opposite ends of the package 34 so as to make the fluid into the supercritical state. The thermionic heat-into-electricity converters 33 are elements that generate heat, when voltage is applied to the thermionic heat-into-electricity converters 33, or generate electricity, when heat is applied to the thermionic heat-into-electricity converters 33. The temperature of the thermionic heat-into-electricity converters 33 is increased, by the adjustment of voltage applied to the thermionic heat-into-electricity converters 33, to make the fluid 31 into the supercritical state. The thermionic heat-into-electricity converters 33 are used to change the density of the supercritical fluid 31, which will be described below. Accordingly, it is also possible to use a device for applying pressure to the supercritical fluid 31 to change the density of the supercritical fluid 31, instead of the thermionic heat-into-electricity converters 33.

In the lens according to the present invention, carbon dioxide ($CO_2$) may be used as the supercritical fluid 31. The carbon dioxide has advantages in that the carbon dioxide has a critical point near the room temperature (Tc=31° C., Pc=73 atm), is innoxious, has fire retardancy, and is very inexpensive. Consequently, when the carbon dioxide is used as the supercritical fluid 31, it is possible to set the interior pressure of the package 34 to 73 atm or more during the packaging of the carbon dioxide into the package 34. After the packaging, the temperature may be set to 31° C. or more such that the fluid 31 is made into the supercritical state.

Other materials may be used, instead of the carbon dioxide, according to circumstances. The critical temperature and critical pressure of usable materials are indicated in Table 1 below. However, the supercritical fluid according to the present invention is not limited to the materials indicated in the following table.

TABLE 1

Critical temperature and critical pressure of materials

| Solvents | Critical Temperature (° C.) | Critical Pressure (atm) |
| --- | --- | --- |
| Carbon Dioxide | 31.1 | 72.8 |
| Ethane | 32.3 | 48.2 |
| Ethylene | 9.3 | 49.7 |
| Propane | 96.7 | 41.9 |
| Propylene | 91.9 | 45.6 |
| Cyclohexane | 280.3 | 40.2 |
| Isopropanol | 235.2 | 47.0 |
| Benzene | 289.0 | 48.3 |
| Toluene | 318.6 | 40.6 |
| p-Xylene | 343.1 | 34.7 |
| Chlorotrifluoromethane | 28.9 | 38.7 |
| Trichlorofluoromethane | 198.1 | 43.5 |
| Ammonia | 132.5 | 111.3 |
| Water | 374.2 | 217.6 |

Hereinafter, a method of controlling the focus of the lens according to the present invention will be described in detail.

FIG. 3B is a sectional view illustrating the lens the focal distance of which is changed by the application of heat to the lens as shown in FIG. 3A using the thermionic heat-into-electricity converters 33. The density of the supercritical fluid 31 is changed, through the fine temperature adjustment of the thermionic heat-into-electricity converters 33, to control a refractive index. With the change of the temperature, the density in the package 34 changes with the result that the volume of the package 34 also changes. In order to maintain the interior pressure of the package 34, the buffer 32, the volume of which is changed to perform a buffering function, is attached to the package 34, such that the buffer 32 is connected to the interior of the package 34, as shown in FIGS. 3A and 3B. When the temperature of the supercritical fluid 31 is increased by the thermionic heat-into-electricity converters 33, diffusion rapidly occurs. Consequently, the size of the buffer 32 is increased, with the result that the density of the supercritical fluid 31 is decreased. That is, the supercritical fluid 31 is changed into a sparse state. When the density of the supercritical fluid 31 is decreased, the refractive index of the supercritical fluid 31 is also decreased. As a result, as shown in FIG. 3A, the focal distance of the lens is increased, and therefore, incident beams 35 are condensed to a point away from the lens.

On the other hand, when a relatively small amount of heat is applied to the supercritical fluid 31 from thermionic heat-into-electricity converters 33, and therefore, the temperature of the supercritical fluid 31 is lowered, the density of the supercritical fluid 31 is increased, and therefore, the supercritical fluid 31 is changed into a dense state, as shown in FIG. 3B. In the dense state, the refractive index of the supercritical fluid 31 is increased. Consequently, the focal distance is decreased, and therefore, incident beams 35 are condensed to a point near the lens.

According to circumstances, it may be changed whether the states shown in FIGS. 3A and 3B are set to states corresponding to specific temperatures. It will be apparent to those skilled in the art that the temperature of the supercritical fluid 31 at the respective states may be changed depending upon which material is used as the supercritical fluid 31 and the focal distance is changed to what extent, according to circumstances.

Figure 4A:
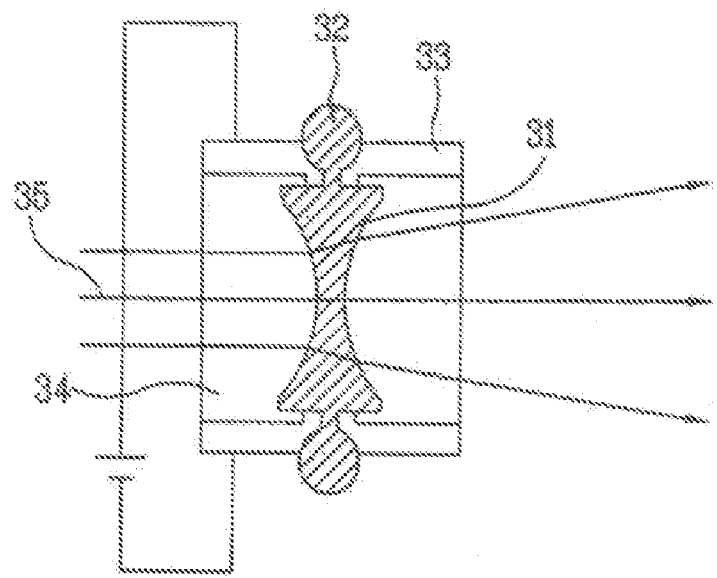
FIGS. 4A and 4B are sectional views illustrating a lens according to another embodiment of the present invention.
Figure 4B:
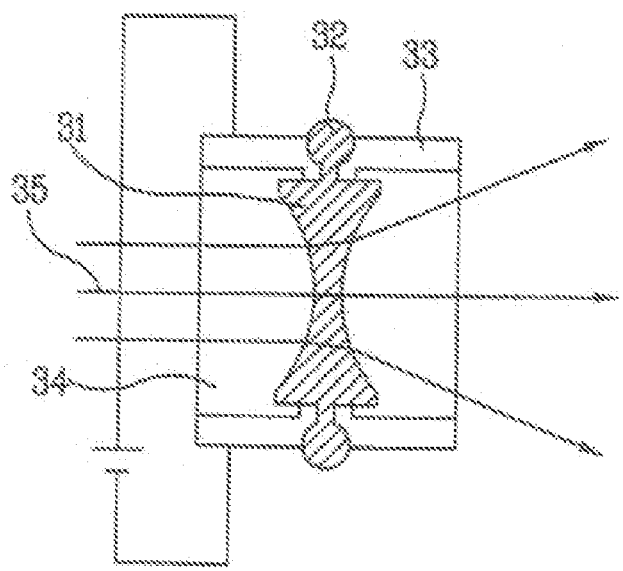

FIGS. 4A and 4B are sectional views illustrating a lens according to another embodiment of the present invention.

As shown in FIGS. 4A and 4B, the interior of the package 34 is patterned in the shape of a concave lens. When the temperature of the supercritical fluid 31 is increased by the thermionic heat-into-electricity converters 33, diffusion rapidly occurs. Consequently, the size of the buffer 32 is increased, with the result that the density of the supercritical fluid 31 is decreased. When the density of the supercritical fluid 31 is decreased, the refractive index of the supercritical fluid 31 is also decreased. As a result, as shown in FIG. 4A, the focal distance of the lens is increased, and therefore, incident beams 35 are diffused lens than that shown in FIG. 4B. On the other hand, when a relatively small amount of heat is applied to the supercritical fluid 31 from thermionic heat-into-electricity converters 33, and therefore, the temperature of the supercritical fluid 31 is lowered, the density of the supercritical fluid 31 is increased, the therefore, the refractive index of the supercritical fluid 31 is increased, as shown in FIG. 4B. Consequently, the focal distance is decreased, and therefore, incident beams 35 are diffused more than that shown in FIG. 4A.

According to circumstances, the interior of the package 34 may be patterned in the shape of an aspherical lens. The spherical lens has advantages in that spherical aberration is reduced, and accurate focusing is accomplished, whereby the aspherical lens provides an image more vivid than the spherical lens. Also, the interior of the package 34 may be patterned in the shape of a cylindrical lens having a cylindrical surface, not the spherical surface. It will be apparent to those skilled in the art that the interior of the package 34 may be patterned in various shapes if necessary. Furthermore, in connection with the above-described embodiments, it is also possible to change density of the supercritical fluid by adjusting the pressure of the supercritical fluid.

When the package 34 is made of a plastic material, which contracts and expands based on the temperature, according to another embodiment of the present invention, instead of a rigid material, such as glass, it is possible to manufacture a lens without the buffer 32. When the plastic material is used to make the package 34, the plastic material must be transparent. As an example of the plastic material which is transparent and which contracts and expands based on the temperature, there is silicon rubber which is used to manufacture an industrial transparent lens or poly methyl methacrylate (PMMA) which is used to manufacture a plastic lens. The silicon rubber is preferably used in the aspect of an appropriate coefficient of contraction and expansion based on the temperature. In addition, it is possible to use various kinds of transparent plastics, and usable materials may be changed depending upon the used supercritical fluid and the size of the lens.

Hereinafter, a method of manufacturing the lens according to an embodiment of the present invention will be describe.

First, a package having a lens shape patterned therein is prepared. At this time, the package may be made of a rigid material, such as glass. Alternatively, the package may be made of a material, such as transparent plastic, having an elasticity depending upon the temperature. The lens shape may be patterned in an aspherical or cylindrical shape in addition to a convex lens and a concave lens.

Subsequently, a supercritical fluid is injected into the lens shape patterned in the package, and then the package is sealed. At this time, it is preferable to set the interior temperature and pressure of the package such that the fluid is changed into a supercritical state.

Subsequently, a volume changing element for changing the volume of the fluid is formed. A temperature changing element and/or a density changing element may be used instead of the volume changing element, as previously described. After that, a buffer for buffering the change in volume of the fluid is formed.

According to the lens and the method of manufacturing the lens as fully described above, the density characteristic of the supercritical fluid is greatly changed depending upon the slight change of the temperature. Consequently, it is possible to change the refractive index of the fluid using low power, thereby changing the focal distance of the lens. For the lens using the supercritical fluid according to the present invention, it is possible to freely design the interior shape of the package, and therefore, it is possible to manufacture various kinds of lenses, such as an aspherical lens and a cylindrical lens, which are not realized by the conventional liquid lens, in addition to a concave lens or a convex lens. Furthermore, the change of the refractive index is great even using low power. Consequently, it is possible to freely move the focal distance of the lens, and therefore, the lens according to the present invention can be used as a subminiature camera lens.

The lens according to the present invention is used in various kinds of products, such as cameras, projectors, and laser printers, such that the focusing or zooming function of the lens is easily performed. When the lens according to the present invention is used in a camera, the lens may be mounted in the opening of a main body of the camera. Also, an iris may be disposed between the lens and the main body of the camera to control the amount of light incident into the main body of the camera through the lens. At this time, it is natural that the iris serves as a shutter when the iris is fully opened and closed.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A lens comprising:
   a package storing a supercritical fluid; and
   a density changing element for changing the density of the fluid.

2. The lens according to claim 1, wherein the fluid is stored in the shape of a convex or concave lens.

3. The lens according to claim 1, wherein the fluid is stored in the shape of an aspheric lens.

4. The lens according to claim 1, wherein the fluid is stored in the shape of a cylindrical lens.

5. The lens according to claim 1, wherein the fluid is carbon dioxide.

6. The lens according to claim 1, wherein the package is made of transparent plastic.

7. The lens according to claim 1, wherein the density changing element applies heat to the fluid to change the volume of the fluid.

8. The lens according to claim 7, further comprising:
   a buffer for buffering the change in volume of the fluid.

9. The lens according to claim 8, wherein, when the volume of the fluid is increased, the buffer expands, whereby the density of the fluid is decreased.

10. The lens according to claim 8, wherein, when the volume of the fluid is decreased, the buffer contracts, whereby the density of the fluid is increased.

11. The lens according to claim 1, wherein the volume changing element applies pressure to the fluid to change the volume of the fluid.

12. A lens comprising:
    a package having a lens shape patterned therein;
    a supercritical fluid stored in the package; and
    a volume changing element for changing the volume of the fluid.

13. The lens according to claim 12, wherein the fluid is packaged in the shape of a convex or concave lens.

14. The lens according to claim 12, wherein the fluid is packaged in the shape of an aspheric lens.

15. The lens according to claim 12, wherein the fluid is packaged in the shape of a cylindrical lens.

16. The lens according to claim 12, further comprising:
    a buffer for buffering the change in volume of the fluid.

17. A camera comprising:
    a main body;
    a lens according to claim 12, the lens being mounted in the main body; and
    an iris for controlling the amount of light incident into the main body through the lens.

18. A method of manufacturing a lens, comprising:
    preparing a package having a lens shape patterned therein;
    injecting a supercritical fluid into the lens shape and sealing the package; and
    forming a volume changing element for changing the volume of the fluid.

19. The method according to claim 18, further comprising:
    forming a buffer for buffering the change in volume of the fluid.

20. The method according to claim 18, wherein the step of injecting the fluid and sealing the package includes
    setting the interior temperature and pressure of the package such that the fluid is changed into a supercritical state.

* * * * *